UNITED STATES PATENT OFFICE.

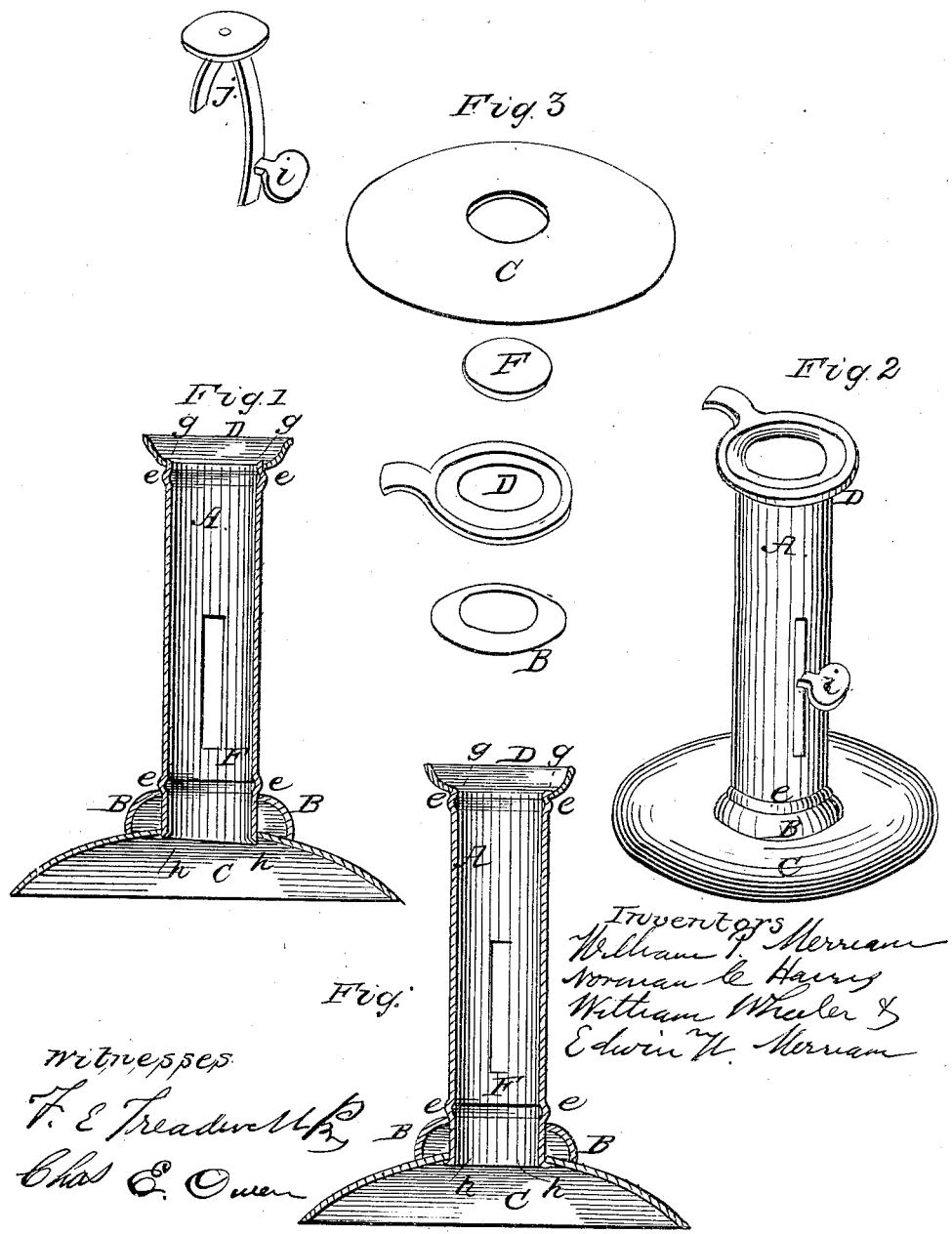

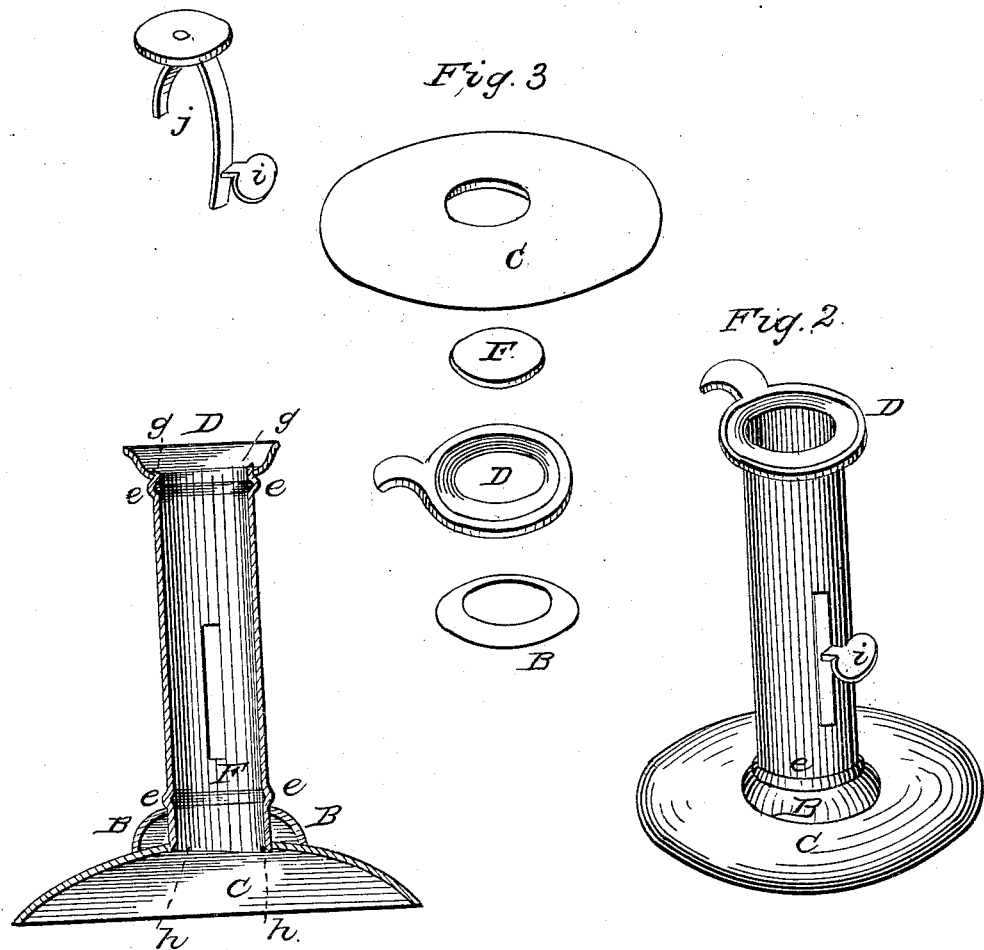

W. P. MERRIAM, N. C. HARRIS, WM. WHEELER, AND E. N. MERRIAM, OF POULTNEY, VERMONT.

CONSTRUCTION OF IRON CANDLESTICKS.

Specification of Letters Patent No. 9,685, dated April 26, 1853.

*To all whom it may concern:*

Be it known that we, WILLIAM P. MERRIAM, NORMAN C. HARRIS, WILLIAM WHEELER, and EDWIN N. MERRIAM, of Poultney, in the county of Rutland and State of Vermont, have invented a new and Improved Mode of Constructing Candlesticks Made of any Suitable Sheet Metal, Such as Iron, Brass, Tin, &c.; and we do hereby declare that the following is a full and exact description thereof, reference being had to the accompanying drawings, and the letters of reference marked thereon, of which—

Figure 1 is a vertical or longitudinal view; Fig. 2, a perspective and Fig. 3, a sectional view.

The nature of our invention consists: first, in so constructing candlesticks made of sheet metal as to save the labor and cost of brazing or soldering the parts together as has heretofore been the mode; secondly, in saving the cost and labor of the bolt and nut used heretofore in attaching the bottom parts to the barrel or upright part; thirdly, in saving the labor and expense of cutting a screw and the stem of the thumb piece, and in the spring or lifter, as formerly, and fourthly in the union of these economical operations.

To enable others skilled in the art to make and use our invention, we proceed to describe the mode by which we construct our candlesticks.

The exterior form of our candlestick is mainly like those heretofore usually made, except that near the top and bottom of the barrel or upright part we form a bead or projection for a shoulder as seen at $e$ Fig. 1 of the accompanying drawings. We then cut out and form the several parts as seen in Fig. 3, and much after the usual manner in size and shape, except that we perforate the bottom C, to the full size of the outside of the barrel A, and also form a shoulder on the stem of the thumb piece for the convenience of riveting it to the lifter as seen at $i$ Fig. 3. We then proceed to attach together the several parts of the lifter $j$ which is of the usual form and made after the usual manner, except that we form a shoulder on the thumb piece $i$, for riveting instead of cutting a screw on the thumb-piece and in the spring of the lifter, and then rivet the thumb-piece $i$ to the spring or lower end of the lifter $j$; and this is done before entering the lifter in the barrel A, but in the usual mode of brazing, the barrel is too much heated to allow the lifter in it while brazing, as it would anneal and destroy it, and in that case, the thumb-piece must be entered in the lifter by a screw. The mode of riveting the thumb piece to the lifter, is more expeditious and more secure from becoming loose, also. We next spread the lower end of the barrel at the seam and insert the lifter while the stem of the thumb-piece is passed along in the seam of the barrel until it reaches its proper opening there. We then insert the round piece or stop F inside the lower end of the barrel A, and in the indentation made by forming the lower bead or shoulder C, when it is made to remain permanently and forms a stop for grease at the lower end of the candlestick. We now put on the top D, bringing it down against the upper bead or shoulder $e$, and also put on the brace B, at the lower end, bringing that against the lower bead or shoulder $e$, then put on the bottom C, bearing it against the brace B. In this condition each end of the barrel A is made to project through the top and bottom about a sixteenth of an inch as seen at $g$, $g$, and $h$, $h$, Fig. 1, for the purpose of fastening and clenching the parts together. While the top and bottom of the barrel A, are thus extended through the top D, and bottom C, we then place the candlestick in a machine for clenching the ends of the barrel, which is done by the pressure of dies at each end of the candlestick upon two mandrels running in a sort of lathe and sliding horizontally and by operating a lever with the foot, are made to press both ends at the same time until a strong clench is formed at each end and the parts thus firmly joined together. We are thus enabled to make a very firm and serviceable candlestick with a saving to the trade of at least 20 per cent.

Having thus fully described the nature of our invention, what we claim therein as new, and desire to secure by Letters Patent is—

The mode of constructing candlesticks of sheet metal, substantially as herein described.

WM. P. MERRIAM.
    NORMAN C. HARRIS.
    WILLIAM WHEELER.
    EDWIN N. MERRIAM.

M. CLARK,
ERWIN S. SUNDERLIN.